Figure 1:
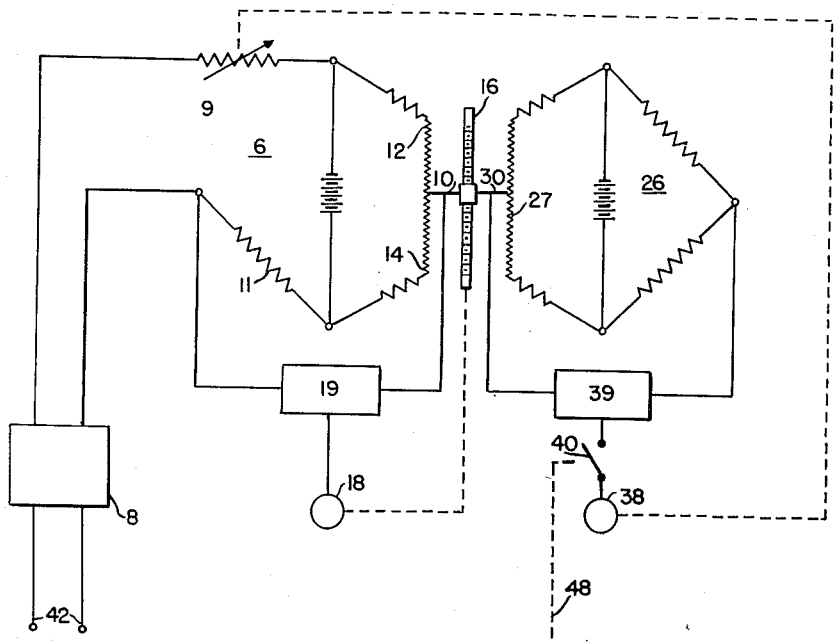

Jan. 26, 1954  J. A. SIDERMAN  2,667,608
FOLLOW-UP TYPE OF CALIBRATING MEANS
Filed May 2, 1951

INVENTOR.
JOSEPH A. SIDERMAN
BY Harry M. Saragovitz
Attorney

Patented Jan. 26, 1954

2,667,608

UNITED STATES PATENT OFFICE 2,667,608

FOLLOW-UP TYPE OF CALIBRATING MEANS

Joseph A. Siderman, Shrewsbury, N. J., assignor to the United States of America as represented by the Secretary of the Army Application May 2, 1951, Serial No. 224,243

6 Claims. (Cl. 318—19)

(Granted under Title 35, U. S. Code (1952), sec. 266)

The invention described herein may be manufactured and used by or for the Government for governmental purposes, without the payment of any royalty thereon.

This invention relates to indicating, controlling, and recording devices, to means for automatically calibrating these devices, and particularly to means for automatically calibrating these devices against a variable reference signal.

The invention described herein is used in conjunction with radiosonde ground station recording equipment, which receives and records the meteorological data that is transmitted—as an audio-modulated signal—from the airborne radiosonde.

The frequency of the audio-modulated signal is controlled by the insertion of resistance type weather sensitive elements in the modulating circuit of the radiosonde. Since detail characteristics of this type radiosonde may be obtained from various texts and this invention does not directly affect or improve the performance of said radiosonde (but does improve the performance and operation of the recording equipment) only a brief reference to the radiosonde and its principle of operation and performance will be dealt with in this disclosure.

In addition to the meteorological data signals transmitted by the airborne radiosonde, a reference signal is transmitted whose function is to indicate the extent of any overall audio frequency shift due to changing local conditions, such as reduced battery voltage, that affect the oscillator.

Signals received from the transmitter are demodulated, measured, and recorded on a continuous graph. It is desirable to keep this graph in a constant state of calibration, which can be done by adjusting the reference frequency reading to its proper normal value on the graph each time the reference frequency is received. A correction to the record is not required when the reference signal is recorded at the predetermined value of 190 cycles or 95 recorder divisions. Should the reference signal, transmitted from the radiosonde, be higher or lower than the normal value, it is desirable to allow the incorrect reference frequency to record a short trace—thereby permitting the magnitude of the error to be determined for evaluating the record—and then correct the reference signal reading in the shortest possible time so that a good trace is obtained at the correct position.

Not all of the signals transmitted by the radiosonde transmitter are received at the ground station, or are strong enough to actuate the indicator or reference calibrator mechanism. It is therefore necessary that the recording equipment and reference corrector be relatively independent of variations of sequence in the incoming signals.

There are several indicating devices known in the art and there are several means for calibrating these indicators, both manually and automatically. However, the problem in radiosonde operation is further complicated by having a variety of signals coming in—of which only one signal of each series of signals represents the reference frequency—and the problem will differ from that of standard calibrating practice in that the reference frequency itself may vary over a considerable range.

It is therefore an object of this invention to provide automatic means for adjusting the record of a reference frequency to a given value.

It is a further object of this invention to provide means for automatically recording the signals arriving from the radiosonde transmitter and re-calibrating the recorder against a reference signal arriving among the other signals in radiosonde transmission.

It is a further object of this invention to provide a device for isolating a reference signal from a series of incoming signals and calibrating a recording instrument against that reference frequency.

Figure 2:
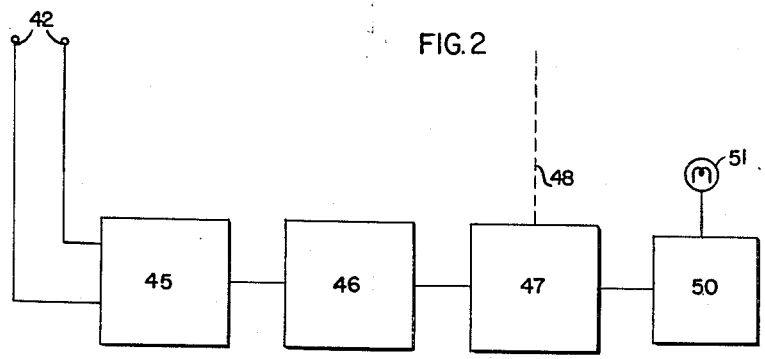

Other and further objects of this invention will become apparent from the study of the following specification and drawing in which Fig. 1 shows the recording unit and automatic reference corrector and Fig. 2 shows a block diagram of a circuit for use therewith.

Referring more particularly to Fig. 1, an indicating instrument 6 is shown in the form of a Wheatstone bridge with the variable signal voltage from the input detector 8 placed on one of the arms 9 of a first pair 9 and 11. The indicator arm 10 is in contact with voltage dividing resistances forming a second pair of arms 12 and 14, and a change in the input voltage across 9 will cause an unbalance across a detector 19. This unbalance actuates suitable electro-mechanical coupling 16 and 18 to move the indicator arm 10 in a direction to restore balance across 19 by a change in the ratio of the arms 12 and 14, thereby representing physically the variation in voltage applied to the indicator 6. Other types of meters having mechanical indicators may also be used here since the balancing and calibrating feature will be effective regardless of the instrument that provides the mechanical representation of the data being received. The indicating arm 10 may be moved by a screw 16 driven by motor 18 that is, in turn, actuated by control circuit 19 that detects any unbalance in the bridge.

The indicating arm 10 is mechanically coupled to an arm 30 of a second Wheatstone bridge 26 which is for calibrating the recorder. The arm 30 may be represented by an electrical contact sliding along a resistance wire 27 so that the balance of the Wheatstone bridge 26 across detector 39 is determined by the position of the contact on the resistance wire. This calibrating circuit is adjusted so that the Wheatstone bridge 26 is balanced when the indicator arm 10 is in a predetermined position. When the arm has been displaced from this predetermined position the Wheatstone bridge will be unbalanced and this balance can be detected by the balance detector 39, where it may also be amplified and applied, through switch contact 40 to actuate a reference adjusting motor 38 to vary the parameters of the original balanced indicator 6. This may be done, for example, by a series resistance 9 which alters the apparent input signal voltage and unbalances the bridge 6 to bring the indicating arms 10 and 30 back to the predetermined, or calibrating position, whereupon the balance detector 39 no longer applies a signal to the bi-directional reference adjusting motor 38. All other signals being applied to indicator 6 thereafter will be recorded as a function of the reference frequency against which the indicator was calibrated.

As noted earlier, the ground station receives a series of signals from the radiosonde transmitter. There are modulations of a radio frequency carrier within the approximate range of from 8 to 220 cycles per second. The lower frequencies are used to represent the variable meteorological data and a frequency of about 190 cycles per second is used as a reference frequency. The reference frequency, theoretically, is constant, but in practice the circuits will vary in unpredictable ways due to the changes in the circuit resulting from the changes in the various elements encountered in actual use and, therefore, the reference frequency may vary more or less. However, a variation in the reference frequency usually indicates that the oscillator itself has varied and that all the other frequencies transmitted will have varied correspondingly, so it is necessary to send out these reference frequencies as a means for determining if any circuit variations have taken place, so that any errors may be corrected.

All of the incoming signals are applied to the input 42 of Fig. 1 and the detector 3 converts the frequencies into voltages to apply to the arm 9 of the bridge so that the values will be recorded by arm 10. The signals are simultaneously applied to the input 42 of Fig. 2, which shows a typical circuit for use in conjunction with this invention. The circuit comprises, basically a high pass filter 45 a time delay circuit 46 and a relay circuit 47. The high pass filter 45 blocks all the signals except those in the reference frequency range, since no automatic correction must be used for data signals. The time delay is effective for both starting and stopping conditions, and allows, in the first case, the corrected signal to make a positive record in order to determine the degree of error. In the second case the delay prevents the cutting off of the correcting equipment in the event of momentary failure of the radiosonde signal. The relay circuit actuates the switch 40 of Fig. 1 and the dashed line 48 represents the connection between the relay circuit 47 and the switch 40.

The variable signals, together with the reference frequency, are applied to the recording indicator circuit so that the indicator and recorder arm registers the instantaneous value of each of the variables in sequence as it is received from the air, and, since a record is made, these variables and the quantities they represent can be read from the recorder. When the reference signal arrives at the bridge, its value is also indicated by the indicating arm whether or not it is at the exact calibration. The same reference signal is passed by the circuits of Fig. 2 and, after the short interval of time established by 46, actuates switch 40 associated with the balance detector and amplifier of Fig. 1. By this means, any unbalance due to a displacement in the indicator arm 30 applies a corresponding energizing signal to the reference adjusting motor 38 which varies the parameters of the indicator circuit 6 to restore the indicating arm 10 to the predetermined calibrated position.

This correcting mechanism may also be used to control any type of condition, such as temperature or liquid level to maintain a preset condition.

It is noted that the reference signal is first permitted to make a record of its value according to the original calibration of the indicator and then, after the time delay established by the time delay circuit 46 of Fig. 2, the reference calibrator is actuated to return the indicator arm to its calibrated position. This gives a positive reading of the errors that have been introduced into the transmitter circuits since the last reference signal was received, and this error may be proportionately applied to all previous uncorrected readings.

Where other types of indicating and recording equipment are used, other corresponding changes in the correctional mechanism can be made. This would be apparent to anyone skilled in the art and would depend on the type of an indicator being used. The balance detector and amplifier 39 could provide the necessary signal to move almost any type sliding indicator arm right or left, up or down, as the case might be, until the pointer is exactly at the desired point.

The receiving circuits with necessary detectors and amplifiers for applying the incoming signals to the indicating device and other circuits, as shown in Fig. 2, are, of course, standard and are not shown in detail here.

An additional output circuit 50 may be energized by the relay 47 to actuate a counter mechanism or indicator lamp 51. The lamp would be desirable to show when the automatic reference corrector is in operation and the counter would be desirable to tell the number of reference signals that have been received, which can readily be translated into an altitude for the purpose of radiosonde data analysis.

What is claimed is:

1. A calibrating instrument comprising; an indicating device for mechanically representing an electrical function, said indicating device having a mechanical indicator, a voltage divider consisting of a resistance wire and a sliding contact, said sliding contact mechanically coupled to said mechanical indicator, a source of potential across said voltage divider, a reference voltage corresponding to the voltage at a given point on said voltage divider, means for determining a potential difference between the voltage at said given point on said voltage divider and said reference voltage, means for controlling the value of the electrical function at the input of said indicating device, said last means being responsive to said means for determining a potential difference, whereby said mechanical indicator can be maintained at an exact point.

2. A calibrating instrument comprising; an indicating device for mechanically representing an electrical function, said indicating device having a mechanical pointer and an input circuit for receiving an unknown voltage, means for generating a second voltage proportional to said unknown voltage, means for controlling the gain of said means for generating a second voltage, a voltage divider comprising a source of electrical potential, a slide wire and a movable contact on said slide wire, said movable contact coupled to said mechanical pointer, a reference voltage source, said reference voltage corresponding to the voltage of a given point on said voltage divider, means responsive to a voltage difference between the voltage at said movable contact on said voltage divider and said reference voltage, said means responsive to a voltage difference being connected to said means for controlling the gain of said second voltage, whereby said second voltage can be maintained at a given value regardless of the value of said unknown voltage.

3. Automatic calibrating means for a recording instrument comprising; means for generating signals proportional to an external signal, electromechanical means for recording the value of said signals, means for increasing and decreasing the proportion between said external and generated signals, a voltage dividing circuit with the voltage dividing point mechanically coupled to the indicating arm of said recording instrument to produce a voltage proportional to the position of said indicating arm, a reference voltage equal to the voltage at a given point on said voltage divider, means responsive to the difference between said reference voltage and said voltage proportional to the position of said indicating arm, a circuit responsive to an external calibrating signal for actuating said last means, said last means actuating said means for increasing and decreasing the proportion between said external and said generated signals whereby said recording instrument can be calibrated at given value when an external calibrating signal is received.

4. Automatic calibrating means for a recording instrument comprising; a first means for generating internal signals proportional to an external signal, a second means having an indicator for recording internal signals, a third means for increasing and decreasing the proportion between said external and internal signals, a voltage dividing circuit with the voltage dividing point mechanically coupled to said indicator to produce a voltage proportional to the position of said indicator, a reference voltage equal to the voltage at a given point on said voltage divider, a fourth means responsive to the potential difference between the reference voltage and the voltage of said voltage dividing point, an electronic circuit responsive to an external calibrating signal, a time delay circuit, said electronic circuit actuating said fourth means after a time delay established by said time delay circuit, said fourth means actuating said third means whereby said recording instrument can be calibrated at given value at a given time after an external calibrating signal is received.

5. Automatic calibrating means for a recording instrument having an indicating arm comprising; a first means for generating internal signals proportional to an external signal, electromechanical means for recording said internal signals, a second means for increasing and decreasing the proportion between said external and internal signals, a voltage dividing circuit having a variable tap mechanically coupled to said recording instrument to produce a first voltage proportional to the position of the indicating arm of said recording instrument, a reference voltage equal to the voltage at a given point on said voltage divider, a third means responsive to the difference between said first voltage and said reference voltage, a first circuit responsive to a calibrating signal within a prescribed range, a time delay circuit, said first circuit actuating said time delay circuit when an external signal within said prescribed range is being received, a relay energized by said time delay circuit, said relay connecting said third means to said second means, whereby said recording means can be automatically calibrated at given value when a calibrating signal is received.

6. A first Wheatstone bridge having a first arm of a first pair of arms as an input for an unknown voltage, a variable resistance in series with said unknown voltage, a variable potentiometer having a movable contact forming the junction of a second pair of arms of said Wheatstone bridge, a first voltage sensitive means across the junctions in said first and second pairs of arms, a first electro-mechanical means for varying the position of the movable contact of said variable potentiometer, said first electro-mechanical means actuated by said first voltage sensitive means whereby said movable contact is adjusted to balance the input voltage and thereby indicate the relative value of said input voltage, a second voltage divider having a movable contact forming a first pair of arms of a second Wheatstone bridge, the movable contact of said first bridge being mechanically coupled to the movable contact of said second Wheatstone bridge, a second pair of arms forming said second Wheatstone bridge, a second voltage sensitive means across the junctions in said first and second pairs of arms of said second Wheatstone bridge, a second electro-mechanical means for controlling the value of the variable resistance in series in said unknown voltage, switching means for connecting said second voltage sensitive means to said second electro-mechanical controlling means, an electronic circuit comprising an input, a filter section, a time delay section and a relay, said filter section responsive to input signals within a given range, said time delay section delaying said last input signals and applying same to said relay, said relay actuating said switching means in response to an input signal of a certain frequency whereby the relative signal applied across the input of said first Wheatstone bridge can be controlled to produce an indication of said movable contact of said first voltage divider, corresponding to a certain point on said second voltage divider, on receipt of a given signal.

JOSEPH A. SIDERMAN.

References Cited in the file of this patent

UNITED STATES PATENTS

| Number | Name | Date |
|---|---|---|
| 2,109,222 | Ryder | Feb. 22, 1938 |
| 2,520,462 | Hartung | Aug. 29, 1950 |
| 2,556,788 | Barnes, Jr. | June 12, 1951 |
| 2,621,315 | Cuckler | Dec. 9, 1952 |